(12) United States Patent
Stellwag

(10) Patent No.: US 8,504,749 B2
(45) Date of Patent: Aug. 6, 2013

(54) SYNCHRONIZATION OF MULTIPLE PROCESSOR CORES

(75) Inventor: Claus Stellwag, Markt Erlbach (DE)

(73) Assignee: Elektrobit Automotive GmbH, Erlangen (DE)

(*) Notice: Subject to any disclaimer, the term of this patent is extended or adjusted under 35 U.S.C. 154(b) by 250 days.

(21) Appl. No.: 13/055,347

(22) PCT Filed: Jul. 22, 2008

(86) PCT No.: PCT/EP2008/006001
§ 371 (c)(1),
(2), (4) Date: Mar. 18, 2011

(87) PCT Pub. No.: WO2010/009743
PCT Pub. Date: Jan. 28, 2010

(65) Prior Publication Data
US 2011/0185154 A1    Jul. 28, 2011

(51) Int. Cl.
*G06F 12/00* (2006.01)
*G06F 9/46* (2006.01)

(52) U.S. Cl.
USPC .......................................... 710/200; 718/107

(58) Field of Classification Search
USPC .................... 710/200; 718/107, 108
See application file for complete search history.

(56) References Cited

U.S. PATENT DOCUMENTS

| | | | | |
|---|---|---|---|---|
| 6,779,090 B2* | 8/2004 | McKenney et al. | ........... | 711/152 |
| 7,383,369 B2* | 6/2008 | Siegwart | ....................... | 710/200 |
| 2007/0050527 A1* | 3/2007 | Tuan | ............................. | 710/200 |

OTHER PUBLICATIONS

Craig, Travis S. "Queuing Spin Lock Algorithms to Support Timing Predictability," Proceedings of the Real Time Systems Symposium, Dec. 1, 1993, pp. 148-157.
International Search Report of PCT/EP2008/006001, mailing date Feb. 18, 2009.
Takada, Hiroaki et al "Predictable Spin Lock Algorithms with Preemption," Real-time Operating Systems and Software 1994 11th IEEE Workshop, May 18-19 1994, pp. 2-6.
Takada, Hiroaki et al "Queuing Spin Lock Algorithms with Preemption," Systems & Computers in Japan, May 1996, vol. 27 No. 5, pp. 15-24.

* cited by examiner

*Primary Examiner* — Glenn A Auve
(74) *Attorney, Agent, or Firm* — Westerman, Hattori, Daniels & Adrian, LLP

(57) ABSTRACT

The invention relates to a spinlock-based multi-core synchronization technique in a real-time environment, wherein multiple processor cores perform spinning attempts to request a lock and the lock is allocated to at most one of the multiple cores for a mutually exclusive operation thereof. A method embodiment of the technique comprises the steps of allocating the lock to the first core requesting it; establishing for each core an indication of a waiting time for receiving the lock; selecting at least one of the spinning cores based on the waiting time indications; and, upon return of the lock, conditionally allocating the lock to the selected core, if the selected core performs a spinning attempt within a predefined time window starting with the return of the lock.

16 Claims, 3 Drawing Sheets

|    | History        | Lock state | Time window | Operation                                     |
|----|----------------|------------|-------------|-----------------------------------------------|
| O1 | init -> ticket | FREE       | -           | Allocate to first requesting core             |
| O2 | ticket -> ticket | LOCKED   | -           | Conditionally write to History                |
| O3 | ticket -> ticket | FREE     | +           | Write to Current                              |
| O4 | ticket -> ticket | FREE     | +           | Allocate to selected core when in Current     |

Fig. 3

SYNCHRONIZATION OF MULTIPLE PROCESSOR CORES

TECHNICAL FIELD

The invention relates to a technique for synchronizing an operation of multiple processor cores. More particularly, the invention relates to a spinlock-based multi-core synchronization technique in a real-time environment.

BACKGROUND

A multi-core computing system comprises multiple processing units or 'cores'; for example, a dual-core CPU comprises two processor cores, a quad-core CPU comprises four cores, etc., wherein the cores may typically be provided on a single chip (a single integrated circuit). A multi-core system allows true parallel processing of multiple processes or tasks such that, e.g., each process or task is executed on a dedicated core. The cores may share common resources, for example a cache or other storage, and/or the interconnections to other portions of the system. The usage of the shared resources has to be properly controlled, i.e. some synchronization of the multiple cores is required in particular to ensure a sequential access to the resources.

Typically a low-level synchronization mechanism is provided by a microcontroller of the multi-core system in the form of a set of instructions; for example, atomic test_and_set instruction(s) may be used to implement a spinlock mechanism. This low-level mechanism may then serve as the basis for service functions (e.g., a semaphore functionality) provided by an operating system.

A spinlock mechanism realizes a mutually exclusive operation of multiple cores with regard to a shared resource. A simple spinlock mechanism may work as follows:
  multiple cores request the lock;
  the lock is allocated to exactly one of the cores; this core may start processing by using the unlocked resource;
  the other cores continue to request the lock, i.e. they repeatedly and continuously check whether the lock is available ("spinning");
  the operating core returns the lock after end of operation;
  the lock is allocated to the core which happens to perform the first spinning attempt after the lock has been returned; this core may start processing, etc.

Thus, an essential aspect of the spinlock mechanism is that the lock, if available, is allocated to the first core requesting it. This spinlock mechanism provides for a simple and generally efficient synchronization below the level of operating system rescheduling and is therefore widely employed, for example in personal computers or general purpose computers.

However, the simple spinlock mechanism does not allow to observe timing constraints. Specifically, it is not possible to calculate the maximum time or a time boundary it may take to fulfil a task. The simple spinlock mechanism allows a "starvation" of cores; i.e. it may happen that a core never receives the lock, because other cores are always faster. Thus, the spinlock mechanism is not deterministic. Moreover, a fair scheduling should also take into account the priorities of the tasks to be executed on the cores. The simple spinlock mechanism allows "priority inversion", i.e. a low priority task executed on one core may block a high priority task on another core which has to wait for the lock.

The above drawbacks make the simple spinlock inappropriate for time-critical environments and in particular for real-time environments, i.e. configurations in which one or more real-time applications are executed on the multi-core system. A typical real-time environment is an automotive environment in which, e.g., safety-critical applications have to be performed. The behaviour of a real-time system (a multi-core system configured for a real-time environment) must be deterministic and fair. In order to make a spinlock-based scheduling applicable for real-time environments, the simple spinlock thus has to be modified.

One solution could be to provide an additional mechanism for, killing a task executed on a core once a time limit is exceeded. However, this mechanism requires additional control overhead, for example an additional mechanism to release the lock, and is still neither deterministic nor fair.

According to another solution, the scheduler may assign a ticket to each spinning core. Each ticket comprises a unique number which may be seen as a 'waiting number' such that the spinning cores are ordered by means of their ticket numbers into a strictly sequential sequence. The lock is then allocated to one core after another as indicated by the tickets. While at first glance this mechanism seems to guarantee that each of the spinning cores will receive the lock, there are still problems. Consider, for example, the case that a waiting core is no longer interested in getting the lock, for example because a time limit for the task to be performed has been exceeded, i.e. the waiting time has been too long and another processing path will be followed instead. When arriving at the ticket of this core, the proceeding controlled by the ticket sequence will hang-up, as the core will never return the lock. Thus, this ticket-based mechanism is not deterministic.

More sophisticated, queue-based techniques may be used, in which the spinning cores are sorted into a queue by defining preceding and succeeding relations between the cores. With regard to the queue then additional mechanisms may be defined, for example, a time-out mechanism which allows that a core may leave the queue due to an exceeded time limit or a re-scheduling from the operating system. However, such queue-based spinlocks are quite complicated. In particular for multi-core systems comprising only few cores the overhead introduced by queue-based spinlocks may be large compared to a simple spinlock. And the overhead will get even larger when additional mechanisms have to be introduced in order to consider the priorities of the tasks running on the cores.

SUMMARY

There is a demand for a fair and efficient technique for synchronizing multiple processor cores.

This demand is satisfied by a method for synchronizing an operation of multiple processor cores performing spinning attempts to request a lock, wherein the lock is allocated to at most one of the multiple cores for a mutually exclusive operation thereof. The method comprises the steps of allocating the lock to the first core requesting it; establishing for each core an indication of a waiting time for receiving the lock; selecting at least one of the spinning cores based on the waiting time indications; and, upon return of the lock, conditionally allocating the lock to the selected core, if the selected core performs a spinning attempt within a predefined time window starting with the return of the lock.

The steps of allocating the lock to the first requesting core and of establishing the waiting time indications may be performed in any sequential order or may be performed in parallel to each other.

The waiting time indications established for the spinning cores may comprise at least one of time stamps and a monotonous sequence of numbers. For example, a ticket may be assigned to each core for which a spinning attempt is detected. A ticket number may be represented by an integer value counted up from one detected spinning attempt to the next.

In one implementation, the waiting time indications are established while the lock is allocated to the first core; for example, a counter for determining the ticket numbers may be reset when the lock is allocated to the first core and may then be counting up with the detected spinning attempts.

In one realization of the method, the step of selecting one of the cores comprises selecting the core with the longest waiting time. This may, for example, be the core with the oldest time stamp or the lowest ticket number. In one mode of this realization, the core with the longest waiting time will get the lock.

A variant of the method comprises the step of assigning a priority to each spinning core. In this variant, the step of selecting a core based on the waiting time indications comprises selecting a core based on its priority. For example, a core may only be selected if its priority is at least the priority of the core to which the lock is currently allocated.

The steps of selecting a core and allocating the lock to the selected core may be repeatedly performed until the time window expires. Additionally or alternatively, the lock may be allocated to the selected core for a predefined time period. In one implementation, the predefined time period is equal to the duration of the time window. The length of one or both of the time window and the time period may allow few instructions only to be performed.

One variant of the method comprises the step of sending a control signal to the core to which the lock has been allocated, if on expiry of the predefined time period the core still holds the lock. The control signal may indicate a request to return the lock.

If within the predefined time window no spinning attempt of the core with the longest waiting time is detected, the lock may be allocated instead to the core with the second longest waiting time (if a spinning attempt corresponding to this core is detected).

The abovementioned demand is moreover satisfied by a computer program product, which comprises program code portions for performing the steps of one or more of the methods and method aspects described herein when the computer program product is executed on one or more computing devices, for example a multi-core system. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

Further, the abovementioned demand is satisfied by a spinlock module for synchronizing multiple cores. The spinlock module comprises a component adapted to allocate the lock to the first core requesting it; a component adapted to establish for each core an indication of a waiting time for receiving the lock; a component adapted to select at least one of the spinning cores based on the waiting time indications; and a component adapted to conditionally allocate, upon return of the lock, the lock to the selected core, if the selected core performs a spinning attempt within a predefined time window starting with the return of the lock.

The spinlock module may further comprise a component adapted to assign a priority to each spinning core.

The abovementioned demand is also satisfied by a multi-core system comprising a spinlock module as outlined above.

BRIEF DESCRIPTION OF THE DRAWINGS

In the following, the invention will further be described with reference to exemplary embodiments illustrated in the figures, in which:

FIG. 3 illustrates a control table implemented in the spinlock module of FIG. 1.

DETAILED DESCRIPTION OF PREFERRED EMBODIMENTS

In the following description, for purposes of explanation and not limitation, specific details are set forth, such as a particularly configured spinlock scheduler, in order to provide a thorough understanding of the current invention. It will be apparent to one skilled in the art that the current invention may be practiced in other embodiments that depart from these specific aspects. For example, for reasons of a clear functional illustration, below it is described that a lock is realized as a lock status register which is accessed only by the scheduler. In other embodiments, additionally or alternatively the cores or processes may directly access a register holding the lock by using, e.g., atomic instructions provided for that purpose. As a further example, while the embodiments below include selecting cores based on their priority, in other embodiments no priority handling may be implemented at all. The techniques described herein may generally be used for synchronizing multiple cores, but may also be used for synchronizing multiple processes on a system with a single processor core.

Those skilled in the art will further appreciate that functions explained herein below may for example be implemented in the form of a hardware circuitry, a combination of software and hardware, or on a pure software (firmware) basis. It will be appreciated that when the current invention is described as a method, this method may be embodied in a processor, e.g. a microcontroller, and a memory coupled to the processor, wherein the memory is encoded with one or more programs that perform the methods disclosed herein when executed by the processor.

Figure 1:
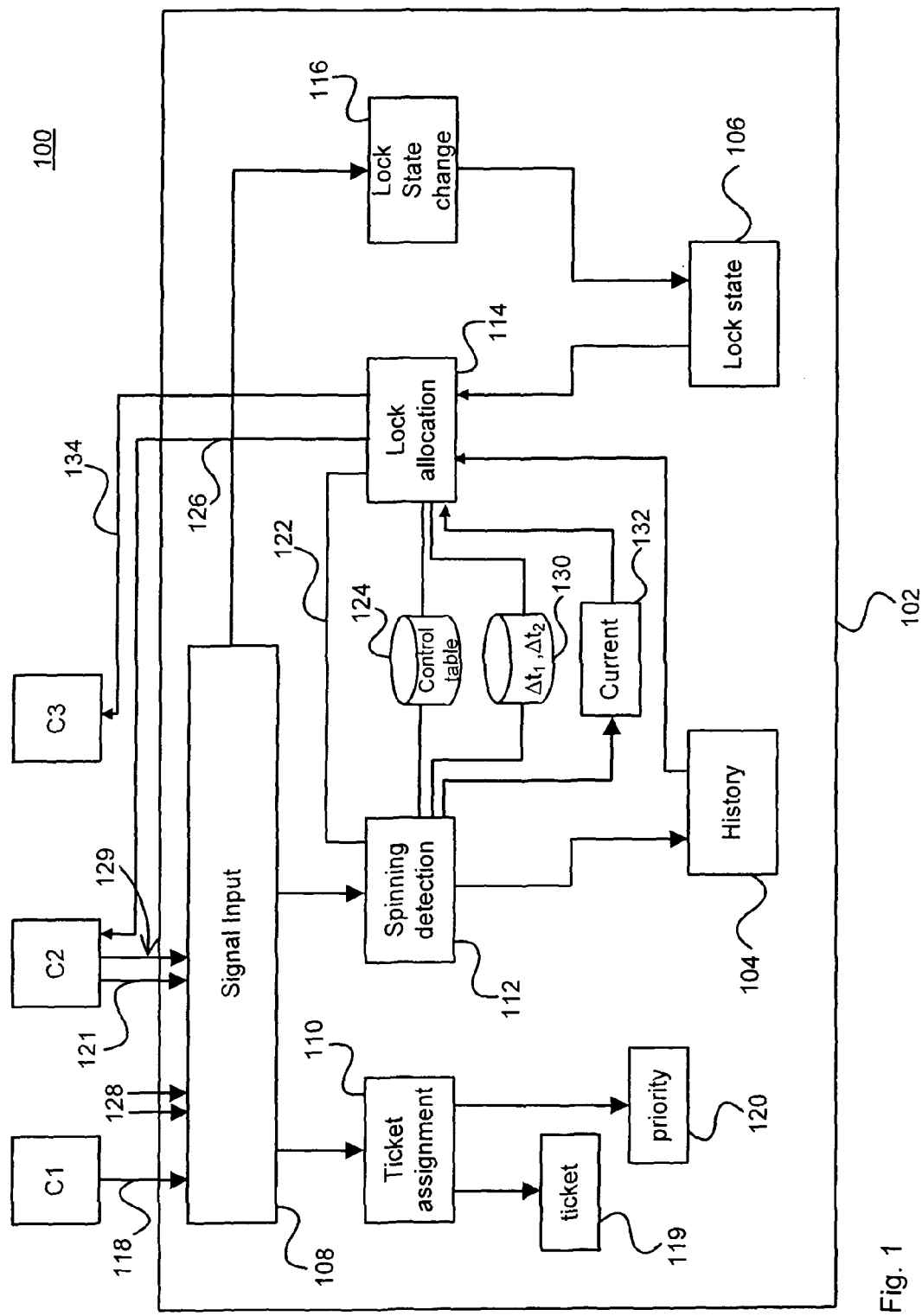
FIG. 1 schematically illustrates an embodiment of a spinlock module.

FIG. 1 schematically illustrates an embodiment of a multi-core system 100 comprising multiple cores C1, C2, C3 and a spinlock module (or scheduler) 102. The spinlock module 102 comprises a history register 104 and a lock state register 106. The history register (or field) 104 may for example be a 1-byte or 2-byte register, while the lock state register may be a 1-bit register. The spinlock module 102 further comprises a signal input component 108, a ticket assignment component 110, a spinning detection component 112, a lock allocation component 114 and a lock state change component 116.

An operation of the spinlock module 102 and an interworking of the components thereof will be described with reference to the sequence of operational steps illustrated in the flow diagram of FIG. 2. Generally, the spinlock module 102 operates to synchronize the multiple processor cores C1, ..., C3 with regard to a usage of a commonly shared resource (not shown in FIG. 1). The spinlock module 102 has to ensure a strict sequential ordering of the access operations of the multiple cores to the shared resource. To this end, the spinlock module or scheduler 102 allocates a lock represented by the lock state register 106 at any given time to at most one of the multiple cores C1, ..., C3 for a mutually exclusive operation thereof. The information stored in both the history register 104 and the lock state register 106 forms the basis for synchronizing the multiple cores.

Figure 2:
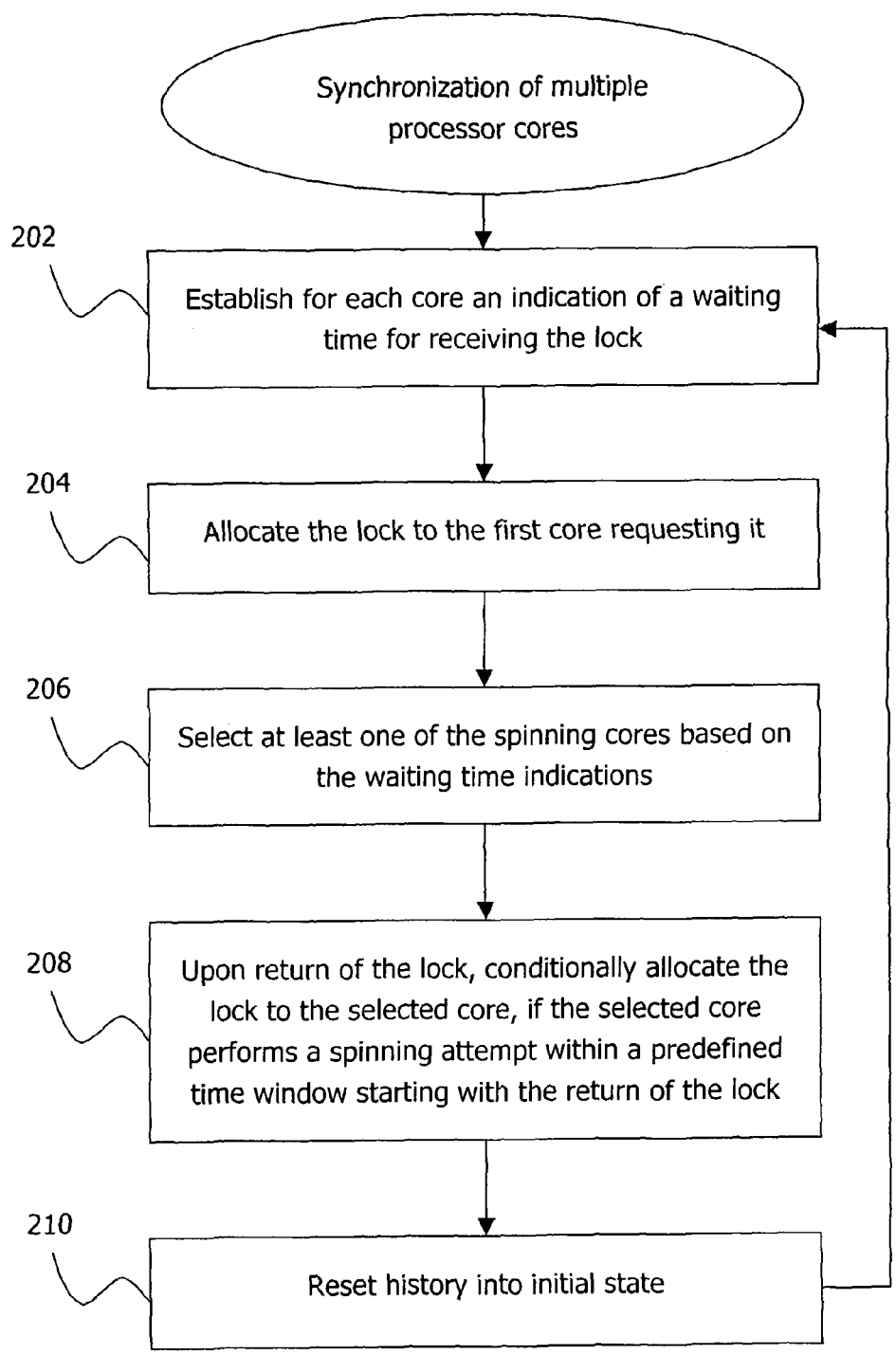
FIG. 2 is a flow diagram illustrating an operation of the spinlock module of FIG. 1.

Referring to FIG. 2, in step 202, the spinlock module 102 operates to establish an indication of a waiting time for receiving the lock for each of the multiple cores. More specifically, the cores C1, . . . , C3 may generally be adapted to request a ticket before attempting to receive the lock. For exemplary purposes, in FIG. 1 it is assumed that core C1 sends a signal 118 to the spinlock module 102. The signal 118 comprises an indication that an assignment of a ticket and a priority is requested by the core C1.

In the embodiment illustrated in FIG. 1, any signal from the cores is received in the signal input component 108, which is configured to forward the signal or generate an internal trigger to an appropriate one of the further components of the spinlock module 102. On reception of the signal 118, the component 108 accordingly triggers the ticket assignment component 110, which operates to assign a ticket and a priority to the requesting core C1. For this purpose, a sub-component 119 for generating a ticket number is driven by the ticket assignment component 110. The sub-component 118 may be a simple counter which upon being triggered by the component 110 generates an integer number by adding +1 to the previously generated number, and provides the generated number to the component 110. In another embodiment, the sub-component 119 may generate a timestamp from a system time, for example by accessing a system clock. Any other mechanism for generating a ticket number may be employed, as long as the generated ticket numbers allow a sequential ordering of the multiple cores reflecting the sequence in time of their ticket requests. For example, besides monotonously increasing sequence of numbers, also a monotonously decreasing sequence of numbers may be used. The term 'numbers' may not only refer to integer numbers, but also to binary numbers, hexadecimal numbers, or similar numerical representations.

The ticket assignment component 110 also triggers a priority sub-component 120 which determines a priority to be assigned to the requesting core C1. The sub-component 120 may determine the priority within the context of the requesting core, i.e. may access additional data related to the requesting core, such as data indicating a priority or importance of the one or more tasks to be executed on the requesting core. The ticket assignment component 110 may trigger provision of a ticket comprising the generated ticket number and priority to the requesting core C1, or the ticket may otherwise be assigned to this core, for example by storing the ticket in association with an ID-number of the requesting core in a buffer (not shown in FIG. 1). In general, any assignment mechanism may be employed which allows the scheduler 102 to associate generated tickets to the spinning cores later on.

In step 204, the spinlock module 102 operates to allocate the lock to the first core requesting it. More specifically, and with regard to the configuration illustrated in FIG. 1, it is exemplarily assumed that the core C2 sends a signal 121 to the spinlock module 102 indicating a request for the lock; i.e. the signal 121 is a spinning attempt performed by core C2. The signal 121 may be identified as a spinning attempt by the signal input component 108, e.g., because a ticket comprising a ticket number and priority is indicated in the signal 121. The ticket may have been assigned to the core C2 in a similar way as described above for the example of core C1. The ticket may be included in the signal 121 or may be stored in association with the spinlock module 102 and may be identified based on an ID-number for the core C2 included in the signal 121, for example.

The signal input component 108 triggers the spinning detection component 112 by indicating the core C2 and/or the ticket assigned to this core. The component 112 normally operates to write the ticket number and priority of the ticket assigned to core C2 into the history register 104. It is assumed that before the writing access the history register is in an initial state, which may be defined by a particular number such as '0000' or any other predefined state, which is generally referred to as the 'INIT' state hereinafter.

The lock allocation component 114 generally operates to allocate the lock to a spinning core in case the lock state represented in the lock state register 106 indicates that the lock is in status 'FREE' (as opposed to the status 'LOCKED'). The lock allocation component 114 may regularly poll the register 106 in order to determine whether an allocation operation has to be performed. Additionally or alternatively, an operation of the lock allocation component 114 may be triggered by control signals from other components. For example, in the course of processing the spinning attempt 121 of core C2 described above, the spinning detection component 112 may trigger the lock allocation component 114. FIG. 1 illustrates a general signal line 122 between the components 112 and 114, which may be used for this purpose. Any other mechanism which lets the lock allocation component 114 detect a change in the lock state register 106 may also be used.

Operations O1-O4 performed by the spinlock module 102, in particular the components 112 and 114, in response to a status or status change of the history register 104 and lock state register 106, are exemplarily illustrated in FIG. 3. In the embodiment of FIG. 1, it is assumed that a control table representing the content of FIG. 3 is provided for access by the components 112 and 114 in a buffer 124, such that the control table 300 may define an operation of these components.

Referring specifically to step 204 in FIG. 2, the control table 300 in FIG. 3 prescribes the operation O1 to be performed by the lock allocation component 114 in case the status of the history register 104 changes from 'INIT' to holding a ticket and the lock state is 'FREE'. In this case, the operation O1 comprises to allocate the lock to the core corresponding to the ticket currently stored in the history 104. Taking the above discussed example further, this is the ticket of core C2 stored by the component 112 in the history 104 in response to the spinning attempt 121. Based on the instruction O1, the lock allocation component 114 extracts the ticket number stored in the history 104 and allocates the lock to the corresponding core C2 (arrow 126 in FIG. 1). As the spinning attempt 121 is assumed to be the first spinning attempt after the history has been (re-)set into the state 'INIT', the operation O1 specifies that the lock is to be allocated to the first core requesting it.

In parallel to allocating the lock to core C2, the lock allocation component 114 may signal the lock state change component 116 to change the lock state in register 106 from 'FREE' to 'LOCKED'.

After the lock has been allocated to the first requesting core in step 204, in step 206 the spinlock module 102 operates to select at least one of the spinning cores based on their respective waiting time indications, i.e. tickets. More specifically, the cores which do not have received the lock, i.e. cores C1 and C3 in FIG. 1, will continue spinning for the lock (this is indicated by short arrows 128 in FIG. 1 for sake of illustration). For each spinning attempt forwarded by the signal input component 108, the spinning detection component 112 analyses the assigned ticket (operation O2 in control table 300 in FIG. 3). The ticket (ticket number and priority) is written to the history register 104 in case two conditions are fulfilled:

1. The priority assigned to the spinning core has to be equal to or higher than the priority currently buffered in the history 104. If this is not the case, the history 104 is not changed and the detection component 112 stops operation.

2. The ticket number assigned to the spinning core has to be an earlier value than the ticket number currently stored in the history 104. For example, in case the ticket numbers are generated from a monotonously increasing number sequence, the spinning core has to have assigned a number which is smaller than the ticket number currently stored in the history 104. A first ticket will be referred to as 'earlier' or 'older' than a second ticket in case the first ticket has been assigned to the corresponding core earlier or before the second ticket has been assigned to its core, irrespective of whether the ticket numbers are based on time stamps, a clock counter, increasing/decreasing sequence of numbers, etc.

In case the ticket number and priority of a spinning core does not fulfil one or both of these conditions, the history 104 is not changed. In this way, the ticket for a particular core will be selected, i.e. in the history the ticket assigned to a core ready to execute a high priority task and waiting already for a long time to get the lock will be stored. For later reference, we may assume that core C3 is selected, i.e. the ticket assigned to core C3 is stored in the history 104.

In step 208, upon return of the lock from the first core, the lock is conditionally allocated to the core selected in step 206, if the selected core performs a spinning attempt within a predefined time window, which starts with the return of the lock. More specifically and with reference to the exemplary embodiment illustrated in FIG. 1, the core C2 which has been allocated the core by signal 126 may, upon completion of its task, provide a signal 129 indicating a lock return to the spinlock module 102. The signal input component 108 forwards the return signal to the lock state change component 116, which operates in response to the forwarded signal to change the lock state held in register 106 from 'LOCKED' to 'FREE'.

Triggered by the status change, the spinning detection component 112 and lock allocation component 116 change its mode of operation during a predefined time window $\Delta t_1$, wherein the value of $\Delta t_1$, i.e. the duration of the time window, is stored in a storage component 130 for access by the spinning detection component 112 and lock allocation component 114. The spinning detection component 112 stops the operation O2 of evaluating and conditionally writing tickets to the history register 104. Instead, the component 112 performs operation O3 (see FIG. 3) which includes writing the ticket number of any spinning core to a current register 132, which may, e.g., be a 1-byte register (the priority of the spinning core need not to be stored in the current register 132).

Within the time window $\Delta_1$, the lock allocation component 114 operates to compare the ticket number buffered in the current register 132 to the ticket number stored in the history register 104 (depicted as operation O4 in the control table 300 illustrated in FIG. 3). The lock allocation component 114 may, for example, regularly poll the current register 132, or may be triggered via signal line 122 by the spinning detection component 112. In case it turns out that a ticket number stored in the current register 132 equals the ticket number stored in the history 104, this means that a spinning attempt of the core which has been selected as harbouring a high-priority task and waiting for a long time has been detected. In this case, the lock allocation component 114 allocates the lock to this core, i.e. the core corresponding to the ticket number stored in the history register 104 and current register 132. In the example discussed here with reference to the configuration depicted in FIG. 1, the selected core C3 has performed a further spinning attempt during the time window $\Delta t_1$ and therefore the lock is allocated to the selected core C3. Further, the component 114 triggers the lock state change component 116 to set the lock state to 'LOCKED'.

Instead of the current register 132, any other configuration might also be employed which allows to compare the ticket number stored in the history 104 with the ticket number assigned to a currently spinning core.

For the case the lock is allocated to the selected core during the time window $\Delta t_1$, in the embodiment described here, a value of a predetermined time period $\Delta t_2$ is stored in the configuration parameter storage 130. The time period $\Delta t_2$ prescribes a maximum operation time for the selected core before to return the lock. In case the selected core does not return the lock before the expiry of the time period $\Delta t_2$, the lock allocation component 114 or any other component of the spinlock module 102 sends a control signal to the selected core in order to force a return of the lock. In the example of FIG. 1, this control signal is illustrated as a signal 134 sent to the selected core C3. Provision of the time period $\Delta t_2$ is optional: In other embodiments, no such additional parameter may be provided, e.g. in an environment in which it is clear that selected cores will return the lock after few operation cycles.

In case the selected core returns the lock before the waiting time window $\Delta t_1$ has been elapsed, the step 208 may be repeated until the time window $\Delta t_1$ expires. For such a situation, the step 206 may comprise selecting two (or more) tickets of spinning cores with a high priority and early ticket numbers. The history register 104 may be adapted to store the selected two (or more) tickets. In another embodiment, the selecting step 206 is repeated during the time the lock is allocated to the selected core within the time window $\Delta t_1$. Upon return of the lock within the time window $\Delta t_1$, the lock may then again be allocated to the core whose ticket is stored in the history register 104.

In step 210, whether or not the lock has been allocated to the selected core(s), the history 104 is reset into the state 'INIT' in any case after the time window $\Delta t_1$ has been elapsed. The operation of the spinlock module 102 may then continue with steps 202 and 204, as described above.

The time window $\Delta t_1$ and time period $\Delta t_2$ may be configurable and may be defined independently of each other, i.e., depending on the concrete environment $\Delta t_1$ may be chosen smaller or larger than $\Delta t_2$. Typically, $\Delta t_1$ may be chosen such that only a small number of operations can be performed in this time. In some embodiments, $\Delta t_1 = \Delta t_2$. In these embodiments, only a single parameter $\Delta t$ may be provided for the time window, during which the scheduler waits for another spinning attempt of the selected core, and the time period for which the lock is at most allocated to the selected core(s).

The steps 202 and 204 in FIG. 2 may be performed in any order. In particular, the step 202 of establishing tickets for spinning cores will be performed once for each core, i.e. may generally be performed repeatedly and continuously when the lock is allocated to a core.

While it has been described above that in the history register 104 the tickets are directly stored, in other embodiments a reference, pointer or similar link to the ticket stored elsewhere may be held in the history register.

While for the sake of illustration the proposed multi-core synchronization technique is applied to a multi-core system with three cores in the embodiment described above, it is to be understood that the technique may be applied to multi-core systems with any number of cores, for example to systems with only two cores and systems with more than three cores, e.g., four or five cores, and also to systems with a large number of cores, e.g., 32, 64 or 128 core systems.

Provision of a history register allows buffering the ticket number or a similar waiting time indication for a core to which one wants the lock to be allocated in order to guarantee a deterministic and fair behaviour of the spinlock mechanism. The core selected in this way has the chance to gain the lock during a small time window, during which the spinlock module waits for a spinning attempt of the selected core, i.e. the core whose ticket is buffered in the history 104. This mechanism allows considering long waiting and/or high priority cores to gain the lock, and thus leads to a deterministic and fair behaviour. No priority inversion does occur.

As the core is allocated to the selected lock only in case this core still spins around, no blocking situation can occur in case the selected core has meanwhile stopped spinning, e.g. because it has been terminated or a time limit has exceeded and the core meanwhile tries another processing path. A starvation of cores does not occur and no extra release mechanism for a blocked lock situation needs to be implemented.

The provision of the time window for allocating the lock to the selected core will not lead to a decrease in processing efficiency, as in many typical cases the oldest/high-priority core will still be spinning and thus the lock will be allocated to this core rapidly after the start of the time window.

The techniques proposed herein increase the usability of multi-core systems as the hardware basis for supporting multiple applications. In particular, it can be ensured that the execution of safety-critical applications cannot be blocked by other applications or tasks. A multi-core system implementing the techniques illustrated herein may be employed in a real-time environment, for example in an automotive environment which uses multi-core microcontrollers.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for synchronizing multiple processor cores performing spinning attempts to request a lock, wherein the lock is allocated to at most one of the multiple cores for a mutually exclusive operation thereof, the method comprising the steps of:
    allocating the lock to a first core requesting the lock;
    establishing for each core an indication of a waiting time for receiving the lock;
    selecting at least one of the spinning cores based on the waiting time indications;
    upon return of the lock, conditionally allocating the lock to the selected core for a predefined time window, the predefined time window starting with the return of the lock; and
    if the selected core performs a spinning attempt within the predefined time window, allocating the lock to the selected core.

2. The method according to claim 1, wherein the step of selecting at least one of the spinning cores comprises selecting a core with a longest waiting time.

3. The method according to claim 2, comprising the step of allocating the lock to a core with a second longest waiting time, if within the predefined time window no spinning attempt of the core with the longest waiting time is detected.

4. The method according to claim 1, wherein the waiting time indications established for the spinning cores comprise at least one of time stamps and a monotonous sequence of numbers.

5. The method according to claim 1, further comprising a step of assigning a priority to each spinning core,
    wherein the step of selecting at least one of the spinning cores further comprises selecting a core based on its priority.

6. The method according to claim 5, wherein a core is selected if its priority is at least the priority of the core to which the lock is currently allocated.

7. The method according to claim 1, wherein the steps of selecting a core and allocating the lock to the selected core are repeatedly performed until the time window expires.

8. The method according to claim 1, wherein the lock is allocated to the selected core for a predefined time period.

9. The method according to claim 8, comprising the step of sending a control signal to the core to which the lock has been allocated, if on expiry of the predefined time period the core still holds the lock.

10. The method according to claim 8, wherein the predefined time period is equal to the duration of the time window.

11. The method according claim 1, further comprising the step of after the time window expires, repeating the steps of method 1.

12. A non-transitory computer program product comprising program code portions for performing the method of claim 1, when the non-transitory computer program product is executed on one or more computing devices.

13. The non-transitory computer program product of claim 12, stored on a computer readable recording medium.

14. A spinlock module for synchronizing multiple cores, comprising:
    a component adapted to allocate a lock to a first core requesting the lock;
    a component adapted to establish for each core an indication of a waiting time for receiving the lock;
    a component adapted to select at least one of the spinning cores based on the waiting time indications; and
    a component adapted to conditionally allocate the lock to the selected core for a predefined time window, the predefined time window starting with a return of the lock, and if the selected core performs a spinning attempt within the predefined time window, allocating the lock to the selected core.

15. The spinlock module according to claim 14, further comprising a component adapted to assign a priority to each spinning core.

16. A multi-core system comprising a spinlock module according to claim 14.

* * * * *

UNITED STATES PATENT AND TRADEMARK OFFICE
CERTIFICATE OF CORRECTION

PATENT NO.        : 8,504,749 B2                                                         Page 1 of 1
APPLICATION NO. : 13/055347
DATED             : August 6, 2013
INVENTOR(S)       : Claus Stellwag It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this

Fifteenth Day of September, 2015

Michelle K. Lee
*Director of the United States Patent and Trademark Office*